US006719630B1

(12) United States Patent
Seelig et al.

(10) Patent No.: US 6,719,630 B1
(45) Date of Patent: Apr. 13, 2004

(54) IMAGE ALIGNMENT GAMING DEVICE AND METHOD

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 0 days.

(21) Appl. No.: 09/967,033

(22) Filed: Sep. 28, 2001

Related U.S. Application Data

(63) Continuation-in-part of application No. 09/894,197, filed on Jun. 27, 2001.

(51) Int. Cl.[7] .......... A63F 13/00

(52) U.S. Cl. .......... 463/16; 463/16; 463/20

(58) Field of Search .......... 463/16, 20, 25, 463/42; 275/138.1, 139

(56) References Cited

U.S. PATENT DOCUMENTS

| | | | | |
|---|---|---|---|---|
| 4,760,388 A | * | 7/1988 | Tatsumi et al. | 345/1.3 |
| 5,373,440 A | * | 12/1994 | Cohen et al. | 705/14 |
| 5,470,079 A | * | 11/1995 | LeStrange et al. | 463/25 |
| 5,609,524 A | * | 3/1997 | Inoue | 463/20 |
| 5,704,835 A | * | 1/1998 | Dietz, II | 463/20 |
| 5,722,891 A | | 3/1998 | Inoue | |
| 5,749,576 A | * | 5/1998 | Heinen et al. | 273/138.1 |
| 6,012,983 A | * | 1/2000 | Walker et al. | 463/20 |
| 6,095,921 A | * | 8/2000 | Walker et al. | 463/20 |
| 6,241,607 B1 | * | 6/2001 | Payne et al. | 463/20 |
| 6,254,481 B1 | * | 7/2001 | Jaffe | 463/20 |
| 6,319,124 B1 | * | 11/2001 | Baerlocher et al. | 463/20 |
| 6,334,814 B1 | * | 1/2002 | Adams | 463/20 |
| 6,347,996 B1 | * | 2/2002 | Gilmore et al. | 463/17 |
| 6,375,570 B1 | * | 4/2002 | Poole | 463/31 |
| 6,383,073 B1 | | 5/2002 | Nagano | |
| 6,383,077 B1 | * | 5/2002 | Kweitko et al. | 463/40 |
| 6,413,162 B1 | * | 7/2002 | Baerlocher et al. | 463/20 |
| 6,533,273 B2 | * | 3/2003 | Cole et al. | 273/138.1 |
| 6,561,904 B2 | * | 5/2003 | Locke et al. | 463/25 |

FOREIGN PATENT DOCUMENTS

| | | | |
|---|---|---|---|
| GB | 2182186 | * | 5/1987 |
| GB | 2191030 | * | 12/1987 |

OTHER PUBLICATIONS

Slot Machines, a pictoral history of the first 100 years, fifth edition, Marshell Fey, copyright 1997, p. 167.*

* cited by examiner

*Primary Examiner*—John M. Hotaling, II
(74) *Attorney, Agent, or Firm*—Ryan A. Heck; Ian F. Burns & Assoc

(57) ABSTRACT

A gaming device for playing a game. The device has a game display with several display sections. A game controller controls several fractional images that are displayed in the display sections. The game controller randomly selects the fractional image to display in each display section. A winning combination results when the fractional images are aligned such that they form a complete image. The game display can be a set of rotatable reels with each reel carrying the fractional images or the game display can be a video display. The game controller selects a number of times to play the game for the same wager. The number of times to play the game is displayed on a game play meter. Each play of the game generates a base award. The base award of each game is added to obtain a cumulative award. In another embodiment, the game generates a multiplier that is multiplied by the base award or the cumulative award to obtain a total prize.

58 Claims, 11 Drawing Sheets

IMAGE ALIGNMENT GAMING DEVICE AND METHOD

CROSS REFERENCE TO RELATED AND CO-PENDING APPLICATIONS

The present patent application is a continuation in part of U.S. patent application Ser. No. 09/894,197, filed Jun. 27, 2001 and is entitled, "Image Alignment Gaming Device and Method" and is herein incorporated by reference.

BACKGROUND OF THE INVENTION

1. Field of Invention

This invention relates to gaming devices and, more particularly, to a gaming device that adds to player excitement and satisfaction.

2. Description of Related Art

Many types of slot and video gaming machines have been designed over the years. The traditional slot machine has a series of annular reels disposed in sidebyside relationship that rotate separately about a common axis. The reels can be implemented mechanically or visually on a video display driven by a computer. The game players score or winnings are indicated by indicia on the peripheral surfaces of the reels, which may align in any of a number of different combinations following a period of rotation of the reels. Players of gaming apparatus typically find it enjoyable to have a variety of different forms of gaming apparatus available. For this purpose, slot machines of the spinning reel type have been provided with a variety of different graphics, shapes, sound effects and scoring systems. Gaming machines that are more interesting generate more player excitement and in turn are played longer resulting in more revenue for the game operator.

Unfortunately, the similarity of slot machines poses a problem for slot machine manufacturers in differentiating their machines from competitors. Modifying slot machines to enhance player enjoyment are not beneficial if the basic geometry and function of the visual components of the machine is retained.

A current unmet need exists for a gaming device that is different than previous slot machines in order to provide game players with a more exciting and desirable gaming experience.

SUMMARY OF INVENTION

1. Advantages of the Invention

An advantage of the present invention is that it provides a gaming device that adds to player excitement and satisfaction.

Another advantage of the present invention is that it provides a gaming device that is interesting to a player and results in longer playing time.

A further advantage of the present invention is that it provides a gaming device that is readily distinguishable from conventional slot machines.

Another advantage of the present invention is that it provides a gaming device that awards a prize when several fractional images are assembled into a complete image.

Another advantage of the present invention is that it provides a gaming device that generates a number of times that a game is to be played.

Another advantage of the present invention is that it provides a gaming device that generates a cumulative prize from each game that is played.

Another advantage of the present invention is that it provides a gaming device that generates a multiplier, the multiplier being multiplied times the cumulative prize to obtain a total prize that is awarded.

These and other advantages of the present invention may be realized by reference to the remaining portions of the specification, claims, and abstract.

2. Brief Description of the Invention

The present invention comprises a gaming device for playing a game that includes a display having several changeable sections. A whole image is divided into several fractional images. One of the fractional images is displayed in each of the changeable sections. A game controller is communicated with the display. The game controller is adapted to generate a winning event in which the whole image is displayed and to generate a losing event in which a non-whole image is displayed. A game play meter is in communication with the game controller. The game controller selects a number of times that the game is to be played. The game play meter displays the number of times that the game is to be played. The game controller adds each prize that is awarded in each game to obtain a cumulative prize. The cumulative prize is displayed on a prize meter. The game controller also generates a multiplier. The multiplier is displayed on a multiplier meter. The multiplier is multiplied by the cumulative prize to obtain a total prize. The total prize is displayed on the prize meter and awarded to the player.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Gaming Device

Figure 1:
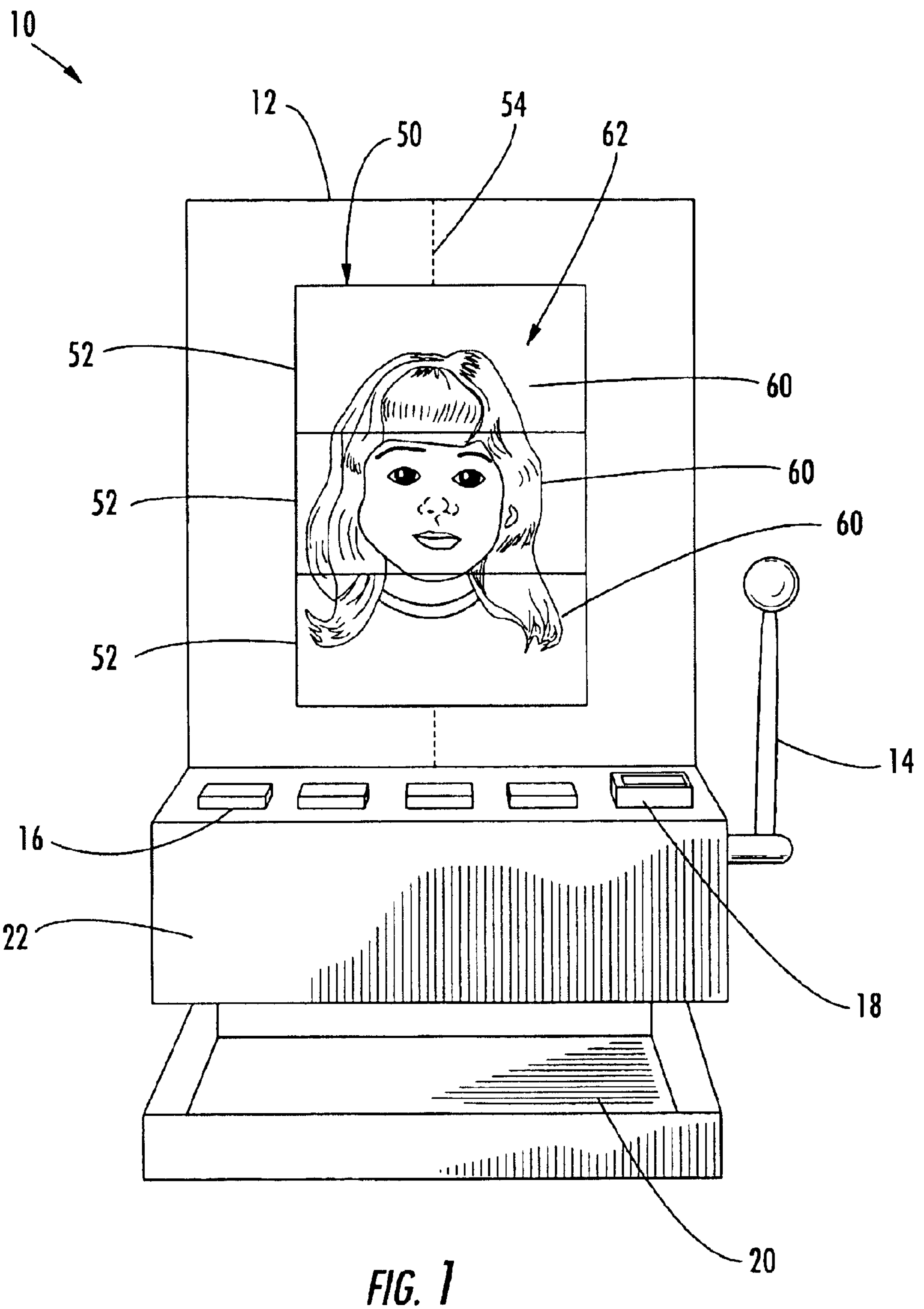
FIG. 1 is substantially a front view of a gaming device in accordance with the present invention in which the image displayed is a whole image.
Figure 2:
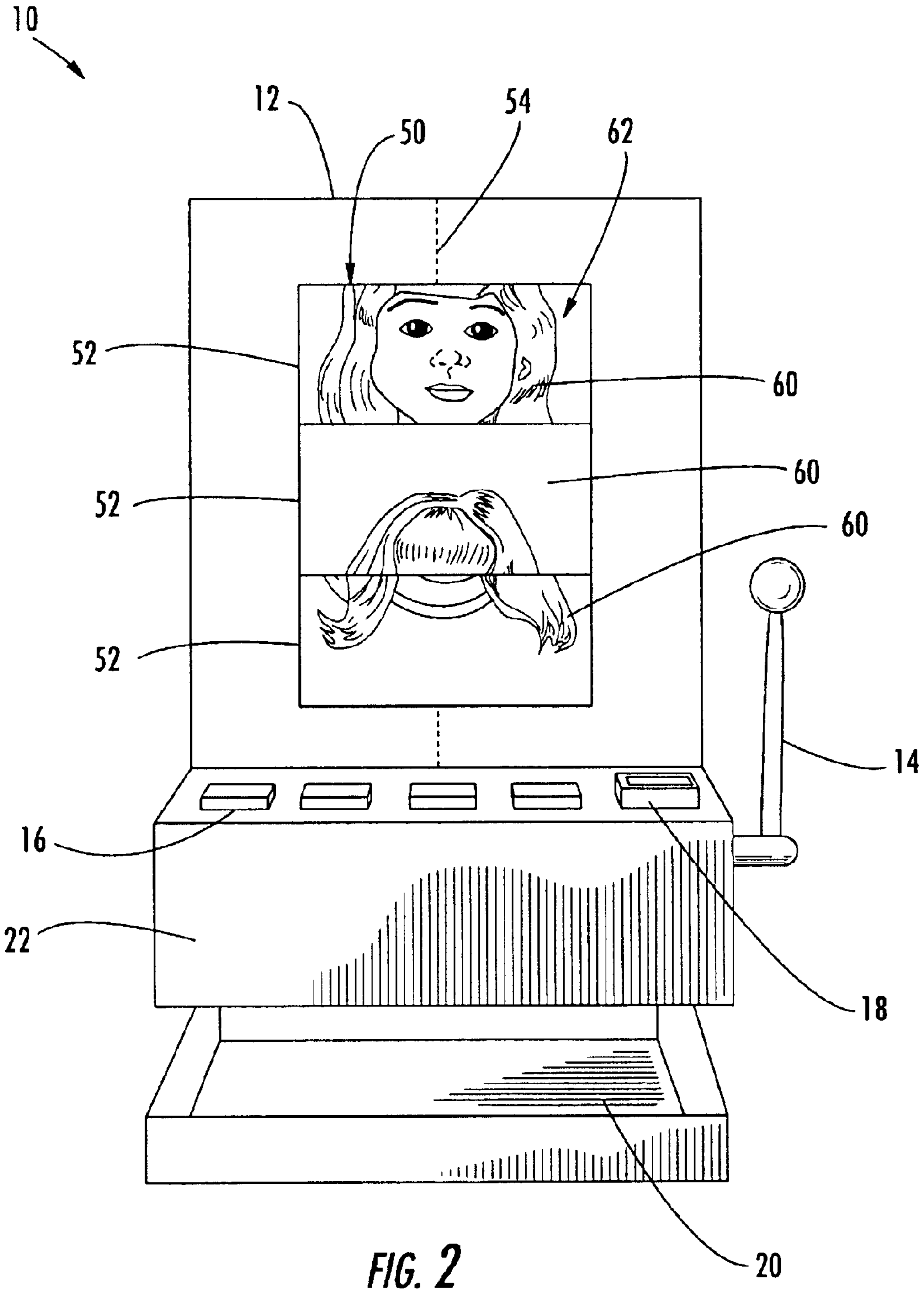
FIG. 2 is substantially a front view of the gaming device of FIG. 1 in which the image is a non-whole image.

Referring to FIGS. 1 and 2, a gaming device 10 is shown. Gaming device 10 comprises a case 12, a game display 50 having several display sections 52, a lever 14, selector buttons 16, a coin acceptor 18, a coin bin 20 and a game controller 22 adapted to control a plurality of fractional images 60 displayed in the display sections 52. The fractional images 60 form a whole or complete image 62.

Case 12 contains the gaming device components. A coin acceptor 18 accepts wagers from a game player. The coin acceptor can also accept tokens, paper currency and vouchers. A coin bin 20, mounted below the case, holds coins that are dispensed after a winning game event has occurred. Lever 14 is used by the game player to initiate play on gaming device 10. Lever 14 is pulled by the game player to start the game.

Display 50 has three display sections 52. Display 50 can be mechanical spinning reels or display 50 can be a video display that simulates mechanical spinning reels or display 50 can be other means to display an image, such as a video display. While display 50 is shown with three display sections 52, more or less sections could be used. For example, a 3×3 matrix of 9 display sections could be used. It is noted that the display sections are oriented or aligned vertically. The axis of rotation 54 of the reels is vertical with respect to viewing the display. The game player stands or sits upright facing the display. The axis of rotation is parallel to the game player. Each of the display sections contains a fractional image 60. The fractional image 60 is a portion of a whole or complete image 62. The image 62 can be a wide variety of interesting subjects such as pictures or paintings including movie stars, celebrities, famous landmarks, musicians, vehicles, buildings, politicians, etc. The whole image is a contiguous recognizable image. If desired a payline (not shown) can be added to the display to aid the player in seeing the alignment of the fractional images.

The whole image 62 is broken up into fractional images 60. In FIG. 1, the whole image has been broken into 3 fractional images. If desired, whole image 62 could be broken into fewer or more fractional images 60. A conventional game controller 22 controls the displaying of the images. Game controller 22 contains a random number generator to cause the mechanical reels or video display to generate a particular combination of fractional images.

During game play, a game player inserts a wager into coin acceptor 18 and then pulls lever 14 to start play. In the case that display 50 are mechanical reels, the reels spin or rotate about axis 54. Several of the fractional images would be placed on circumference of the reels. The fractional images move horizontally with respect the player viewing the display. As discussed above, the images could move vertically, diagonally, a combination thereof, or in other ways. The game controller 22 selects a particular image to stop at or display in each display section 52. Typically, the selector buttons 16 are used to tell the controller when to stop the rotating reels. In the case that display 50 is a video display, the video display simulates the mechanical reels and game controller 22 selects a particular image to stop at or display in each display section 52. In FIG. 1, the fractional images 60 line up to form a complete or whole image 62. In this example, the whole image 62 is a girls face. In FIG. 2, the fractional images 60 do not line up to form a complete or whole image 62.

When the display sections 60 form a complete or whole image 62, a game-winning event is generated and the player is dispensed a payout in accordance with a payout table. When the display sections do not form a complete or whole image 62, a game losing event is generated and the player must deposit more coins or use accumulated credits to play again. If desired, the payout table can be structured to make a partial payout depending upon the number of fractional images that are properly aligned. For example, if 2 of the 3 images are properly aligned, the payout could be 50 percent of the payout for having all 3 of the images properly aligned. In the case where display 50 has multiple spinning reels to form a matrix of display sections 52, the complete image may be formed along a diagonal of the matrix or can be formed by having all of the display sections 52 show the complete images.

Flowchart

Figure 3:
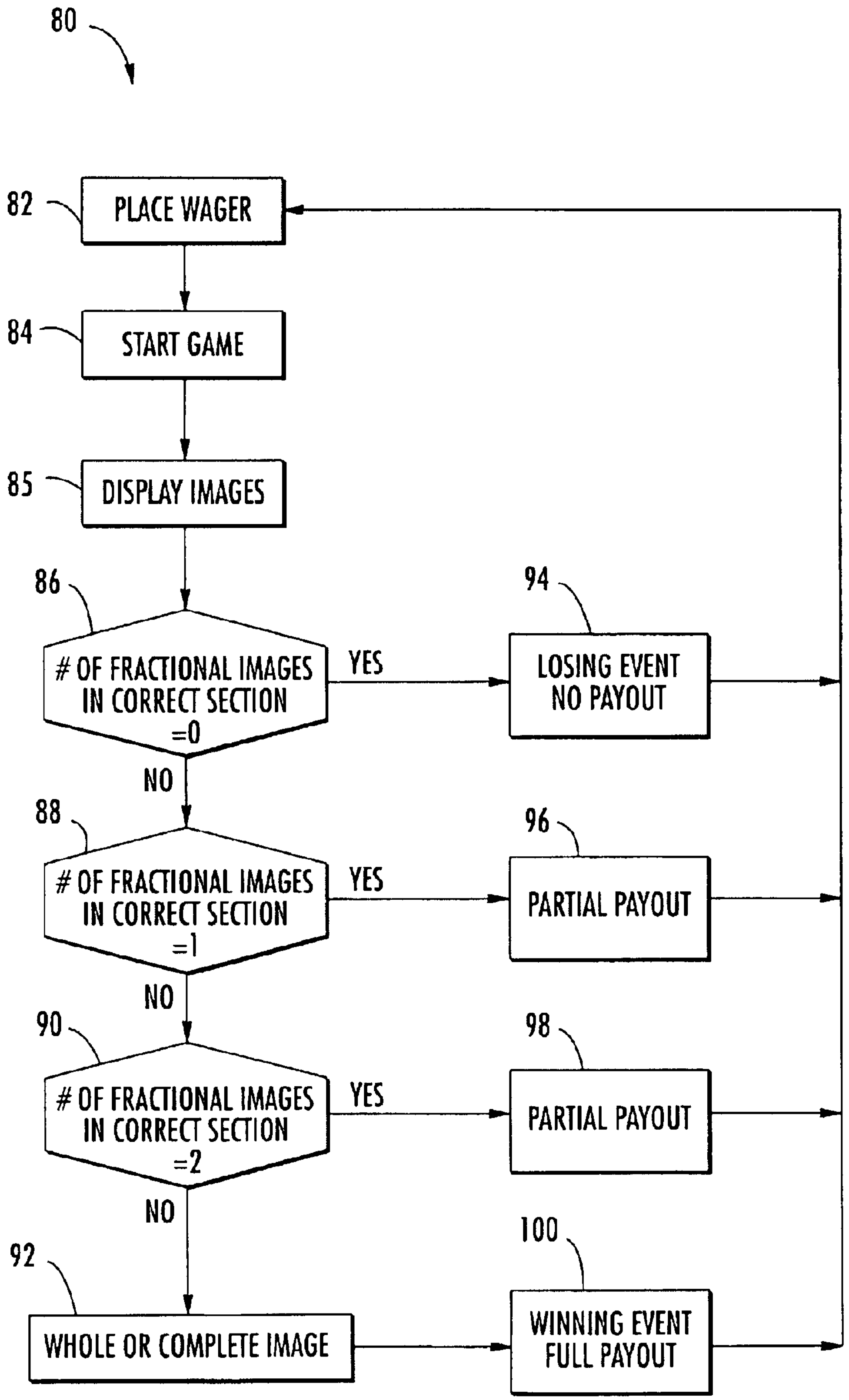
FIG. 3 is substantially a flow chart showing the operation of the gaming device of FIG. 1.

Referring to FIG. 3, a flowchart 80 is shown. Flowchart 80 depicts the steps followed in playing a game on gaming device 10. A wager is placed by the game player at step 82 in order to start game play on gaming device 10. At step 84, the player pulls lever 14 in order to start the game. At step 85, the game controller 22 determines which images are to be displayed in each display section and displays those images. Game controller 22 randomly selects the image to be displayed in each display section. Next, gaming device 10 moves to a decision step 86. At decision step 86 the number of fractional images that are aligned in the correct location or display section are determined. If the number of correctly aligned images is equal to zero, a yes is returned and the game progresses to step 94 where a losing event is determined along with no pay out of an award. From step 94, the game loops back to step 82 to allow the game player to place another wager. If a no is returned at decision step 86, the game moves to decision step 88.

At decision step 88 the number of fractional images that are aligned in the correct location or display section is compared to see if they are equal to one. In the case where the answer is "yes" at step 88, the game progresses to step 96 where a payout is determined according to a redefined pay table and paid. For example, if a wager of one dollar was placed, the payout for correctly aligning one of the three images could be 50 cents. From step 96, the game loops back to step 82 to allow the game player to place another wager. If a no is returned at decision step 88, the game moves to decision step 90.

At decision step 90 the number of fractional images that are aligned in the correct location or display section is compared to see if they are equal to two. In the case where a yes is returned at step 90, the game progresses to step 98 where a partial payout is determined and paid. For example, if a wager of one dollar was placed, the payout for correctly aligning two of the three images could be one dollar. From step 98, the game loops back to step 82 to allow the game player to place another wager. If a no is returned at decision step 90, the game moves to step 92.

At step 92 the number of fractional images that are aligned in the correct location or display section is equal to three. The game next moves to step 100 where a full payout is determined and paid for a game-winning event. For example, if a wager of one dollar was placed, the payout for correctly aligning all of the three images could be two dollars. From step 100, the game loops back to step 82 to allow the game player to place another wager.

Bonus Game Embodiment

Figure 4:
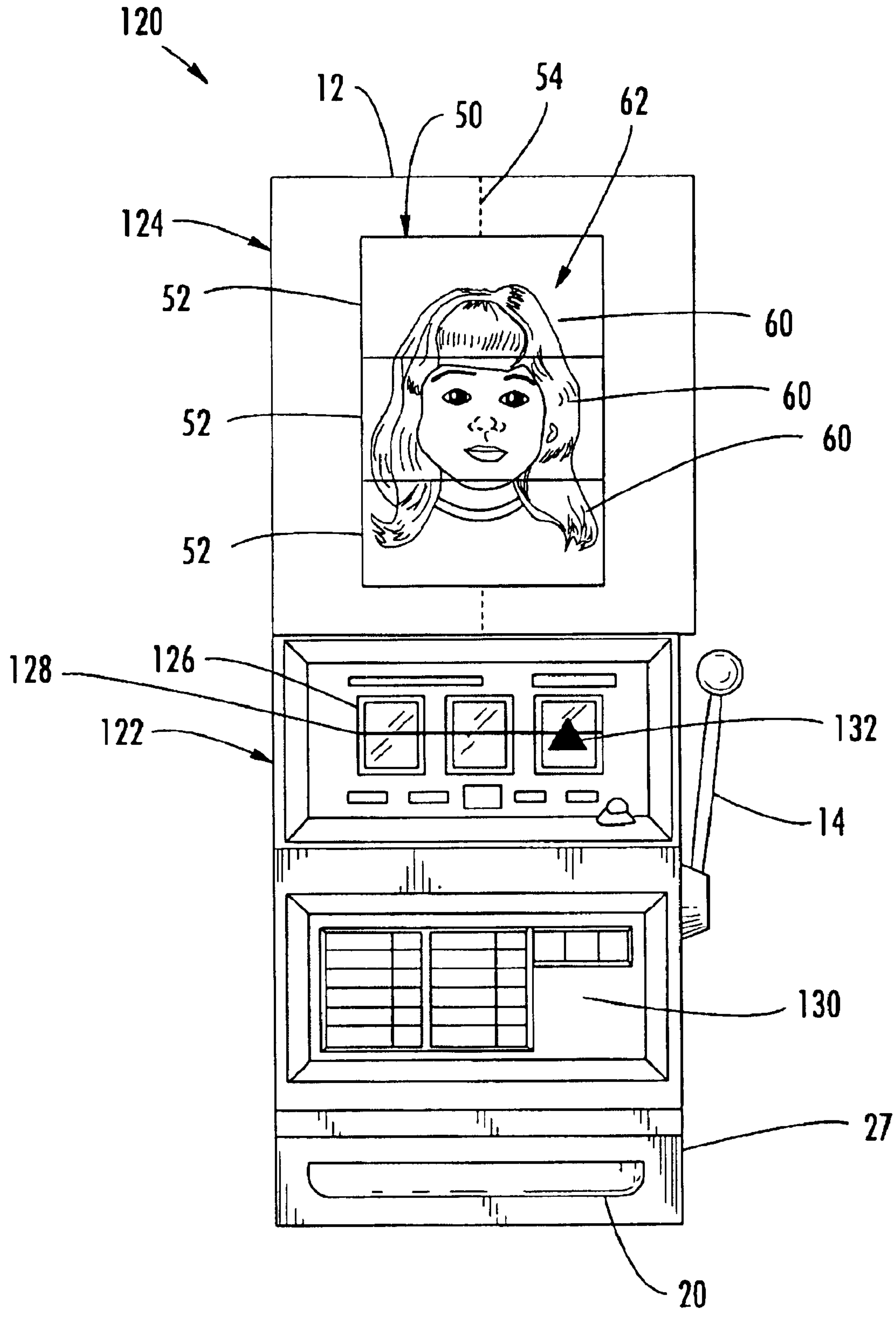
FIG. 4 is substantially a front view of an alternative embodiment of a gaming device in which the present invention is used as a bonus game.

The gaming device shown in FIGS. 1 and 2 is configured as a primary game. The gaming device can also be used as a bonus game that is attached to another primary game. Referring to FIG. 4, a bonus gaming device 120 is shown. Gaming device 120 comprises a primary game 122 and a bonus game 124 mounted on top. Primary game 122 can be almost any game. In FIG. 4, game 122 is shown as a conventional slot machine. Primary game 122 comprises several rotating reels 126 with a payline 128 that is actuated by a lever 14. One or more meters or displays 130 tell the game player their winnings and remaining playing credits. A special symbol 132 is generated on payline 128 to signify a bonus qualifying or generating event. After a bonus qualifying event has occurred the bonus game 124 becomes available for play. Bonus game 124 would then be played in a similar manner as to gaming device 10. The conventional slot machine triggers a bonus-qualifying event that allow the game player the opportunity to play game device 124 to win a bonus prize or payout.

Bonus Game Flowchart

Figure 5:
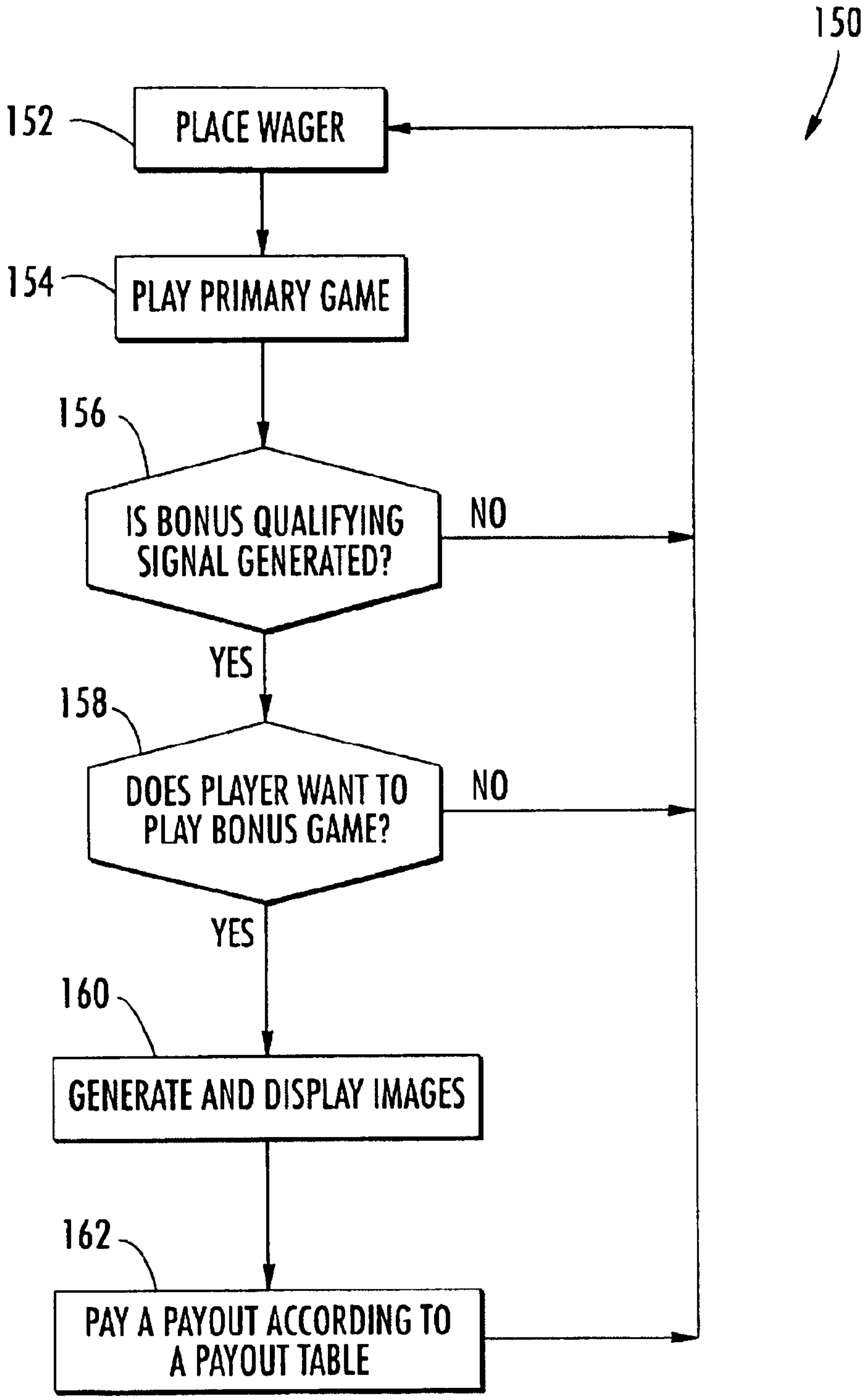
FIG. 5 is substantially a flow chart showing the operation of the bonus gaming device of FIG. 4.

Referring to FIG. 5, a flowchart 150 of the operation of bonus gaming device 120 is shown. Flowchart 150 depicts the steps followed in playing the bonus game. A wager is placed by the game player at step 152 in order to start game play on gaming device 122. At step 154, the player plays the primary gaming device 122. Next, gaming device 122 moves to a decision step 156. At decision step 156 the, game checks to see if the bonus-qualifying event has occurred. If the bonus-qualifying event has not occurred, the game loops back to step 152 to allow the player the opportunity to place another wager and play the primary game again. If the bonus-qualifying event has occurred at step 156, the method continues to decision step 158. At decision step 158, the player may elect to play the bonus game or return to the primary game. If the player elects to return to the primary game, the game loops back to step 152. If the player elects to play the bonus game, the game proceeds to step 160. At step 160, the player plays the bonus game 124, which generates and displays either fractional or whole images. The operation at this point of the bonus game 124 is identical to that of gaming device 10 of FIGS. 1 and 2. At step 162, the game player is then paid a payout depending upon the number of images that are correctly aligned. The game then loops back to step 152 to allow the player to play the primary game 122 again.

Alternative Embodiment

Figure 6:
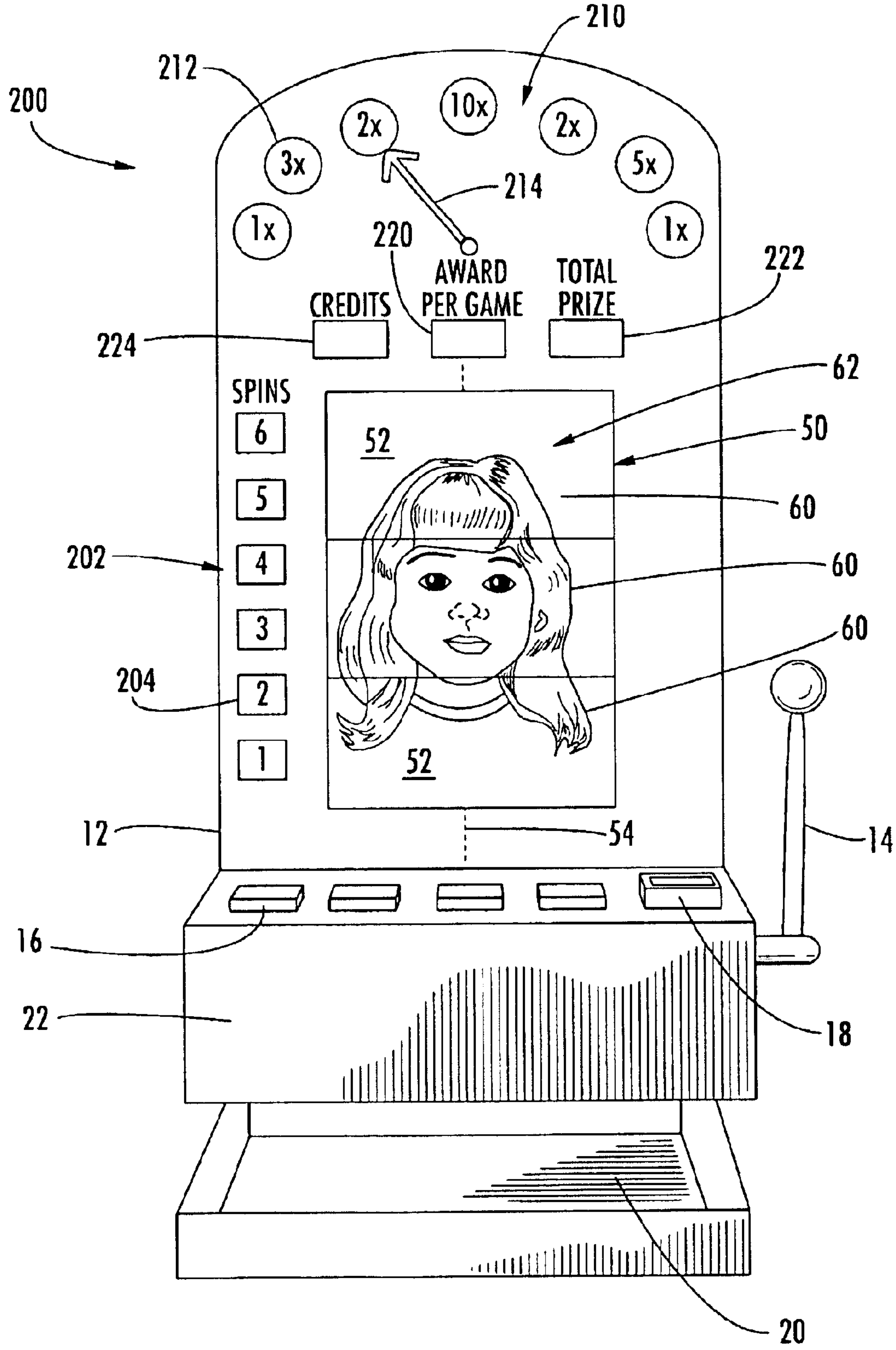
FIG. 6 is substantially a front view of an alternative embodiment of a gaming device in accordance with the present invention.

Referring to FIG. 6, an alternative embodiment of a gaming device 200 is shown. Gaming device 200 is similar to gaming device 10 of FIG. 1 with the addition of a spin or game play meter 202 and a multiplier meter 210. Gaming device 200 comprises a case 12, game play meter 202, multiplier meter 210, a game display 50 having several or more display sections 52, a lever 14, selector buttons 16, a coin acceptor 18, a coin bin 20 and a game controller 22 adapted to control a plurality of fractional images 60 displayed in the display sections 52. The fractional images 60 form a whole or complete image 62.

Game play meter 202 has several spin indicators 204 labeled 1 through 6 spins that are aligned vertically. Game play meter 202 may be shown as a voltage meter for example. Meter 202 is in communication with game controller 22. The indicator 204 displays the number of times selected by game controller 22 that the game is to be played or repeated for one wager. Spin indicator 204 displays a randomly generated integer for the number of times that the game is to be played. For example, if gaming device 200 selects three (3) times to play the game, indicator 204 would light up or other wise indicate that three plays or spins of display 50,would occur. The spins would occur sequentially without the need for the game player to pull lever 14. An award for each game is generated in the same manner as in gaming device 10. That is, when a whole image is formed, a prize or award is generated. The award from each game is added to obtain a cumulative award or prize. The cumulative award or prize is displayed on meter 220. If no award or prize is won in any of the spins, a consolation prize may be generated by game controller 22 and awarded.

Multiplier meter 210 is located at the top of case 12. Multiplier meter 210 selects and displays a multiplier that the cumulative award or prize is to be multiplied by to obtain a total prize that is then awarded to the game player. Multiplier meter 210 has several multiplier indicators 212 and an arrow 214. Multiplier meter 210 is in communication with game controller 22. Game controller 22 randomly selects a multiplier. Arrow 214 points to the multiplier selected by game controller 22. Arrow 214 can be a mechanical arrow that is rotated or can be one of several arrows that light up to point to the selected multiplier. The selected multiplier is multiplied by the cumulative award shown on meter 220 to obtain a total prize that is then paid to the player. The total prize is shown on total prize meter 222. The total prize is added to the game player's credit meter 224.

Gaming device 200 is shown as a primary game in FIG. 6. Gaming device 200 could also be used as a bonus game. In the case where gaming device 200 is used as a bonus game, it would replace bonus gaming device 124 in FIG. 4. Gaming device 200 would be mounted on top of primary gaming device 122.

Alternative Embodiment Flowchart

Figure 8:
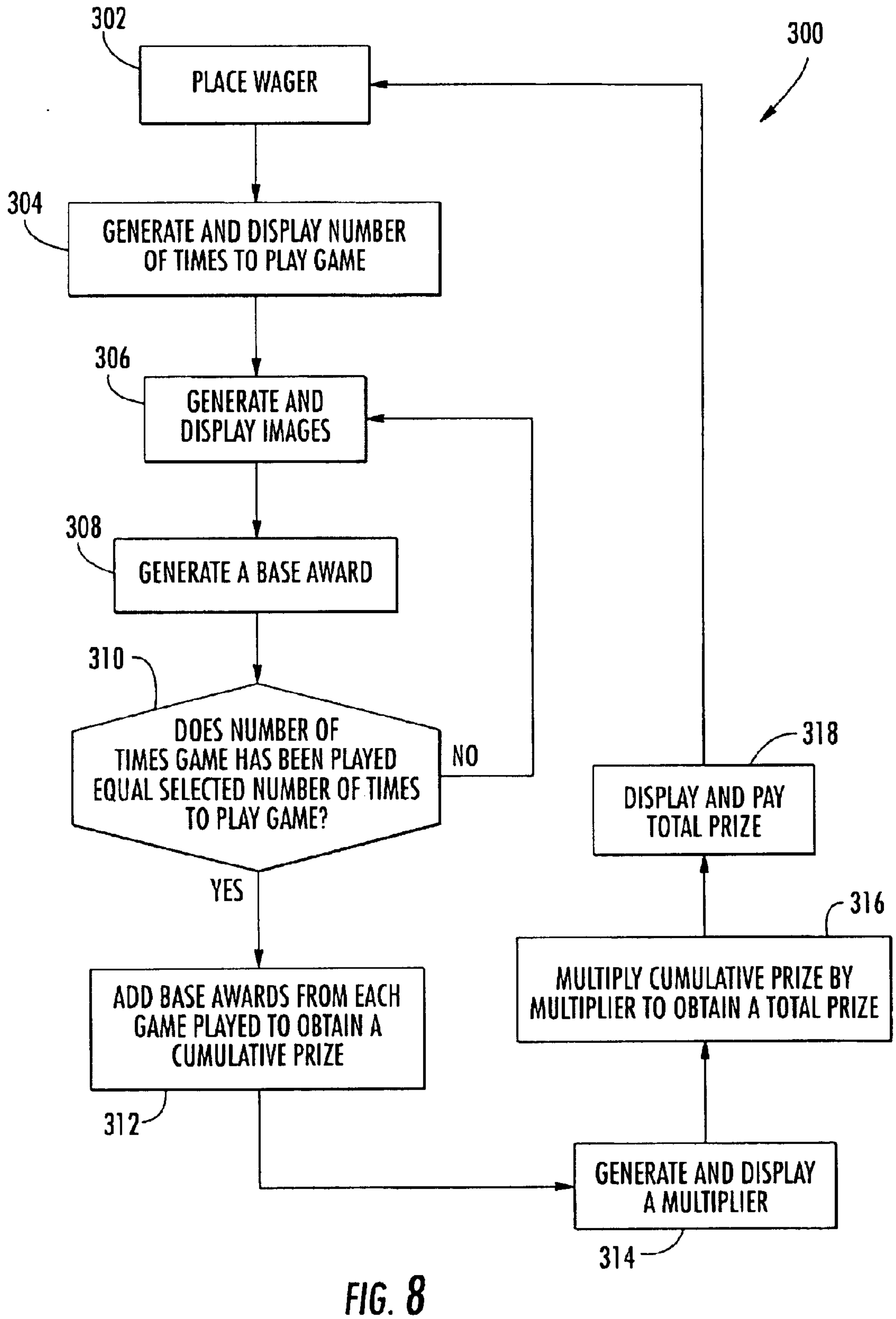
FIG. 8 is substantially a flow chart showing the oration of the gaming device of FIG. 6.

Referring to FIG. 8, a flowchart 300 is shown. Flowchart 300 depicts the steps followed in playing a game on gaming device 200. A wager is placed by the game player at step 302 in order to start game play on gaming device 200. At step 304, game controller 22 randomly selects a number of times to play a game on gaming device 200. The number of games is displayed on game play meter 202. At step 306, the game controller 22 determines which images are to be displayed in each display section and displays those images. Game controller 22 randomly selects the image to be displayed in each display section. At step 308, a base award is generated depending upon the number of images that are correctly aligned. The game then proceeds to decision step 310 where the number of games played is compared to the selected number of times to play gaming device 200. If the number of times that gaming device 200 has been played is not equal to the selected number of times, the game loops back to step 306 where the images are generated and displayed again. If the number of times that gaming device 200 has been played is equal to the selected number of times, the game proceeds to step 312. At step 312 the award from each individual game played is added to obtain a cumulative prize. The cumulative prize is displayed on meter 220.

Next, the game proceeds to step 314 where game controller 22 randomly selects a multiplier. The multiplier is shown on multiplier meter 210. At step 316, the multiplier is multiplied by the cumulative prize to obtain a total prize. The total prize is shown on total prize meter 222. Next, at step 318 the total prize is displayed and paid. The game then returns to step 302 where the game player is allowed to place another wager and play again.

Alternative Bonus Embodiment Flowchart

Figure 9:
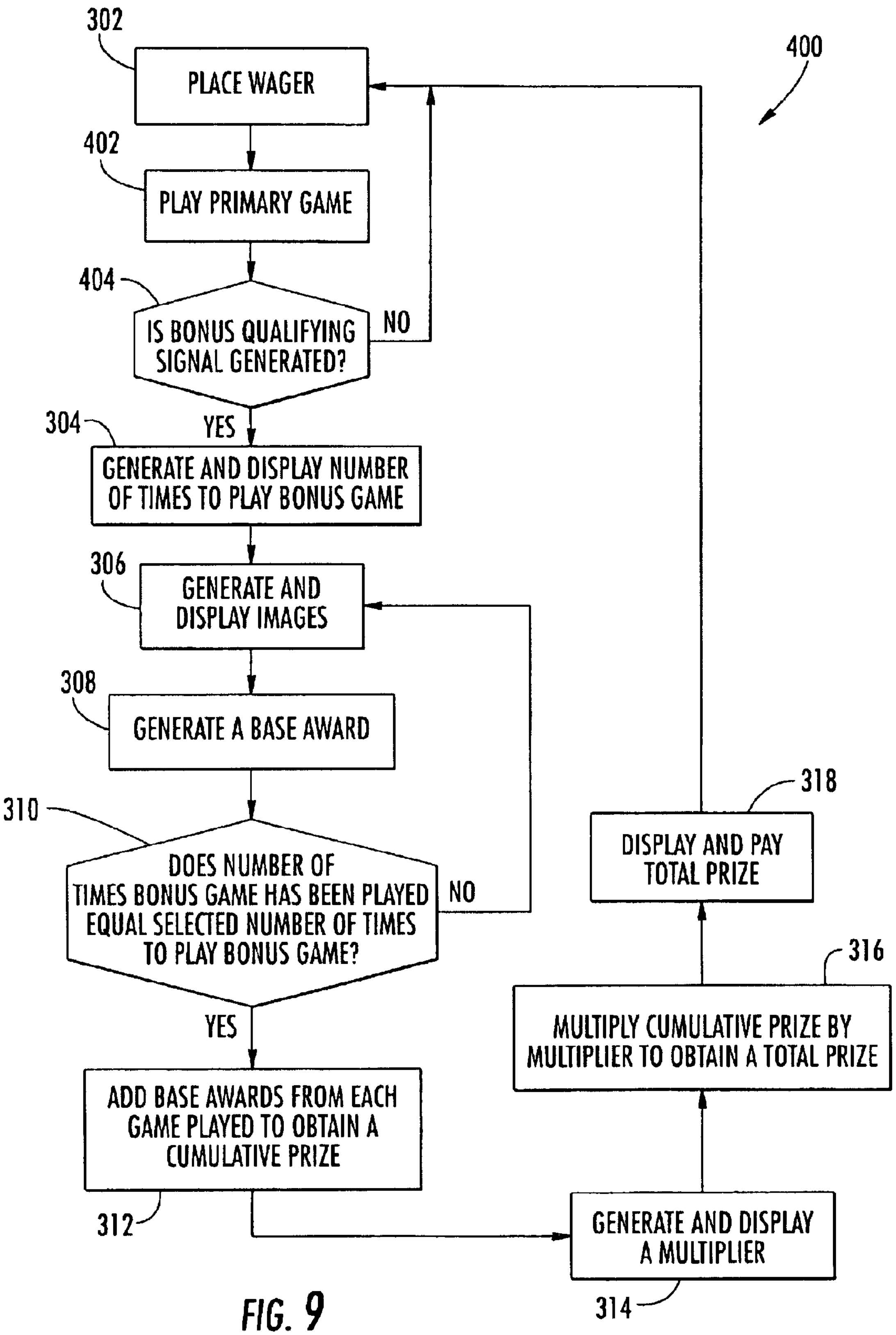
FIG. 9 is substantially a flow chart showing the operation of the gaming device of FIG. 6 when used as a bonus game in conjunction with a primary game.

Referring to FIG. 9, a flowchart 400 is shown. Flowchart 400 depicts the steps followed in playing a game on gaming device 200 when it is used as a bonus game in conjunction with primary game 122. A wager is placed by the game player at step 302 in order to start game play on gaming device 122. At step 402, the game player plays primary game 122. Next, at decision step 404 the game checks to see if a bonus-qualifying event has occurred. If the bonus-qualifying event has not occurred, the game loops back to step 302 to allow the player the opportunity to place another wager and play the primary game again. If the bonus-qualifying event has occurred at step 404, the method continues to step 304 to allow the player to play the bonus game. At step 304, game controller 22 randomly selects a number of times to play a game on gaming device 200. The number of games is displayed on meter 202. At step 306, the game controller 22 determines which images are to be displayed in each display section and displays those images. Game controller 22 randomly selects the image to be displayed in each display section. At step 308, a base award is generated depending upon the number of images that are correctly aligned. The game then proceeds to decision step 310 where the number of times the game has been played is compared to the selected number of times to play gaming device 200. If the number of times that gaming device 200 has been played is not equal to the selected number of times, the game loops back to step 306 where the images are generated and displayed again. If the number of times that gaming device 200 has been played is equal to the selected number of times, the game proceeds to step 312. At step 312 the award from each individual game played is added to obtain a cumulative prize. The cumulative prize is displayed on meter 220.

Next, the game proceeds to step 314 where game controller 22 randomly selects a multiplier. The multiplier is shown on multiplier meter 210. At step 316, the multiplier is multiplied by the cumulative prize to obtain a total prize. The total prize is shown on total prize meter 222. Next, at step 318 the total prize is displayed and paid. The game then returns to step 302 where the game player is allowed to place another wager and play primary game 122 again.

Second Alternative Embodiment

Figure 7:
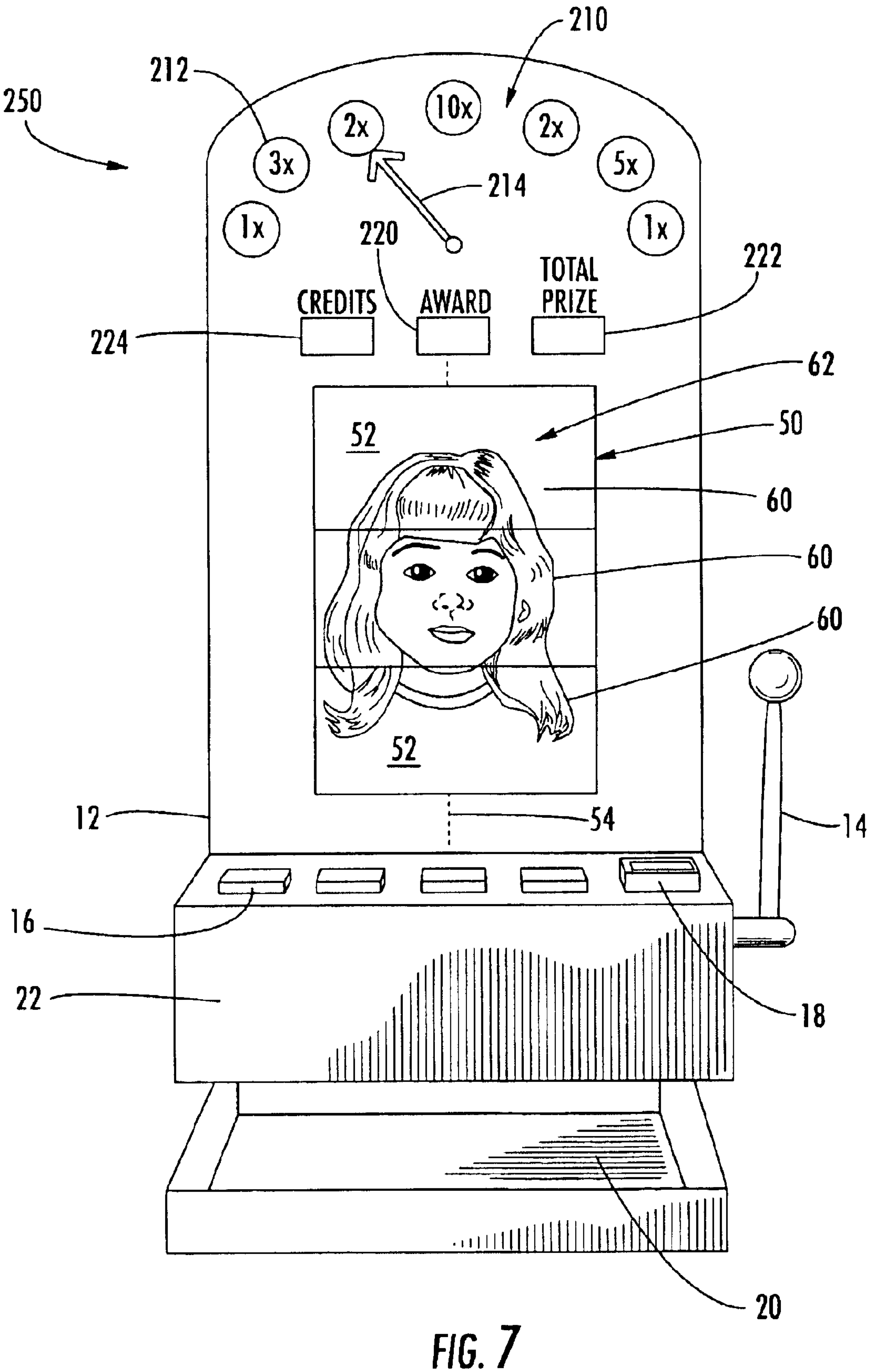
FIG. 7 is substantially a front view of another embodiment of a gaming device.

Referring to FIG. 7, an alternative embodiment of a gaming device 250 is shown. Gaming device 250 is similar to gaming device 200 of FIG. 6 except that spin or game meter 202 is not present. Gaming device 250 comprises a case 12, multiplier meter 210, a game display 50 having several display sections 52, a lever 14, selector buttons 16, a coin acceptor 18, a coin bin 20 and a game controller 22 adapted to control a plurality of fractional images 60 displayed in the display sections 52. The fractional images 60 form a whole or complete image 62.

Multiplier meter 210 is located at the top of case 12. Multiplier meter 210 selects and displays a multiplier that the award or prize in the game is to be multiplied by to obtain a total prize that is then awarded to the game player. Multiplier meter 210 has several multiplier indicators 212 and an arrow 214. Multiplier meter 210 is in communication with game controller 22. Game controller 22 randomly selects a multiplier. Arrow 214 points to the multiplier selected by game controller 22. Arrow 214 can be a mechanical arrow that is rotated or can be one of several arrows that light up to point to the selected multiplier. The selected multiplier is multiplied by an award meter 220 to obtain a total prize that is then paid to the player. The total prize is shown on total prize meter 222. The total prize is added to the game player's credit meter 224.

Gaming device 250 is shown as a primary game in FIG. 7. Gaming device 250 could also be used as a bonus game. In the case where gaming device 250 is used as a bonus game, it would replace bonus gaming device 124 in FIG. 4. Gaming device 250 would be mounted on top of primary gaming device 122.

Second Alternative Embodiment Flowchart

Figure 10:
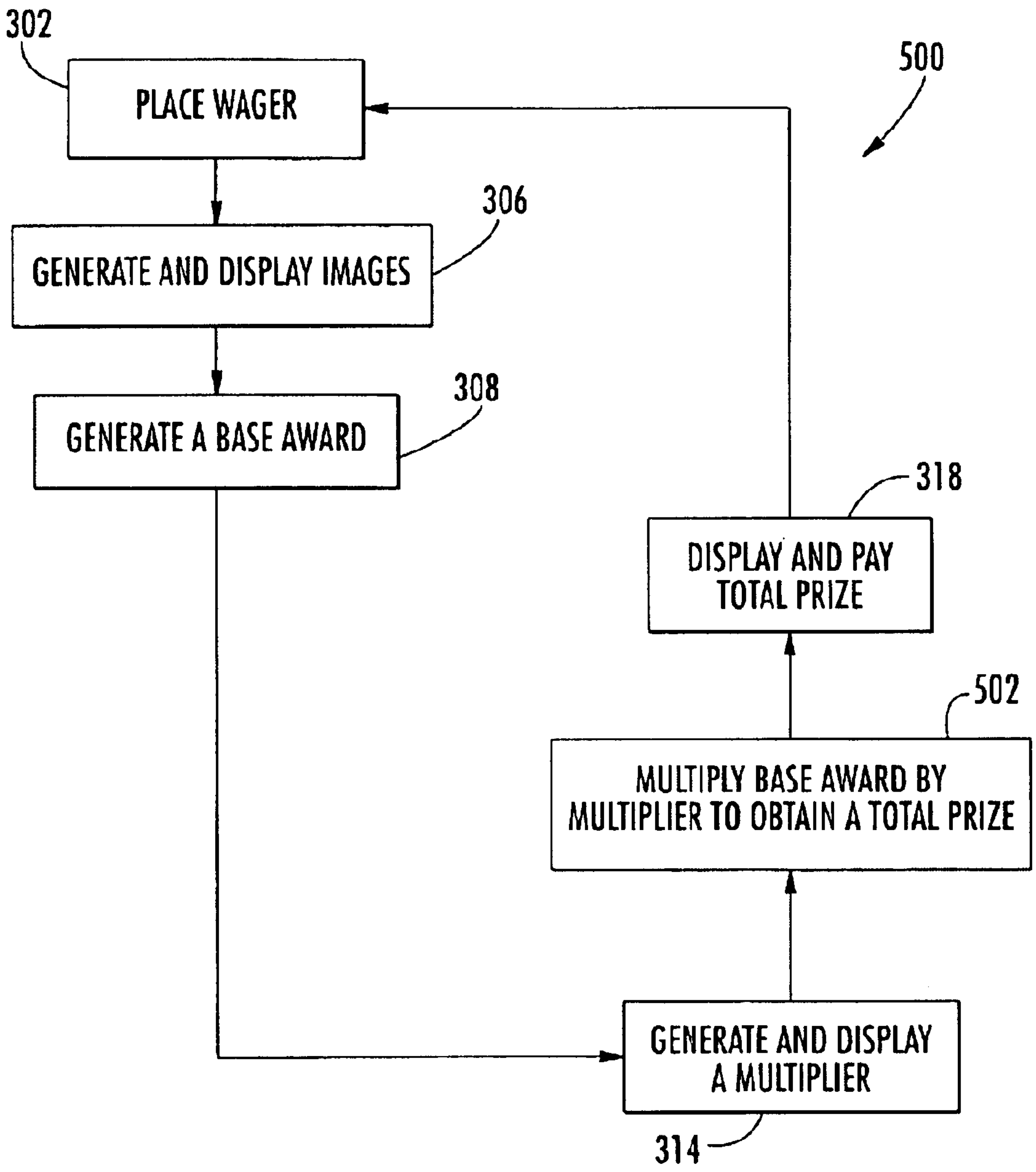
FIG. 10 is substantially a flow chart showing the operation of the gaming device of FIG. 7.

Referring to FIG. 10, a flowchart 500 is shown. Flowchart 500 depicts the steps followed in playing a game on gaming device 250. A wager is placed by the game player at step 302 in order to start game play on gaming device 250. At step 306, game 250 generates and displays an image. Game controller 22 randomly selects the image to be displayed in each display section. At step 308, a base award is generated depending upon the number of images that are correctly aligned. The game then proceeds to step 314 where game controller 22 randomly selects a multiplier. The multiplier is shown on multiplier meter 210. At step 502, the multiplier is multiplied by the base award or prize to obtain a total prize. The total prize is shown on total prize meter 222. Next, at step 318 the total prize is displayed and paid. The game then returns to step 302 where the game player is allowed to place another wager and play again.

Second Alternative Bonus Embodiment Flowchart

Figure 11:
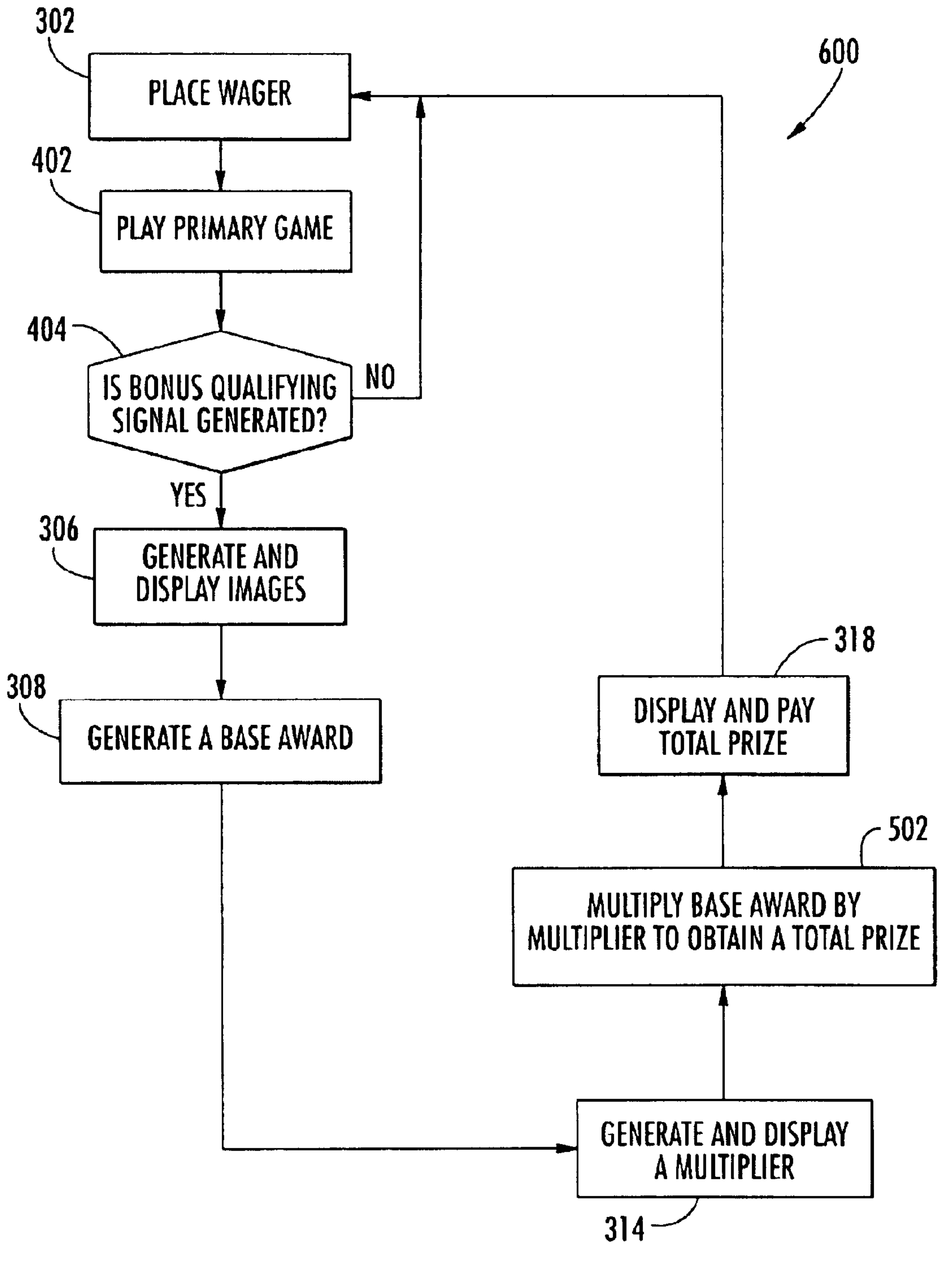
FIG. 11 is substantially a flow chart showing the operation of the gaming device of FIG. 7 when used as a bonus game in conjunction with a primary game.

Referring to FIG. 11, a flowchart 600 is shown. Flowchart 600 depicts the steps followed in playing a game on gaming device 250 when it is used as a bonus game in conjunction with primary game 122. A wager is placed by the game player at step 302 in order to start game play on gaming device 122. At step 402, the game player plays primary game 122. Next, at decision step 404 the game checks to see if a bonus-qualifying event has occurred. If the bonus-qualifying event has not occurred, the game loops back to step 302 to allow the player the opportunity to place another wager and play the primary game again. If the bonus-qualifying event has occurred at step 404, the method continues to step 306 to allow the player to play the bonus game. At step 306, the game controller 22 determines which images are to be displayed in each display section and displays those images. Game controller 22 randomly selects the image to be displayed in each display section. At step 308, a base award is generated depending upon the number of images that are correctly aligned. The base award is displayed on meter 220.

Next, the game proceeds to step 314 where game controller 22 randomly selects a multiplier. The multiplier is shown on multiplier meter 210. At step 502, the multiplier is multiplied by the base award to obtain a total prize. The total prize is shown on total prize meter 222. Next, at step 318 the total prize is displayed and paid. The game then returns to step 302 where the game player is allowed to place another wager and play primary game 122 again.

CONCLUSION

The present invention solves many of the problems associated with the prior art. The present invention provides a gaming device that adds to player satisfaction and excitement. The present invention also provides a gaming device that is readily distinguishable from conventional slot machines. The present invention provides a gaming device that awards a prize when several fractional images are displayed as a complete image. The present invention provides a gaming device that allows a game to be played a randomly determined number of times and also randomly generates a multiplier to provide for larger prizes.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A gaming device for playing a game by a player, the gaming device comprising:

(A) a housing;

(B) a display device coupled to the housing, the display device configured to present a game of chance having at least a partially randomly determined game outcome; and (C) a game controller in communication with the display device, the controller configured to:

(a) determine at least a first game outcome;

(b) determine if the first game outcome comprises a bonus qualifying outcome;

(c) if the first game outcome comprises a bonus qualifying outcome, the controller configured to:

(i) determine a number of games to play;

(ii) cause the display device to display each of the determined number of games;

(iii) determine a second game outcome for each of the determined number of game;

(iv) for each of the determined number of games, if the second game outcome is a winning outcome, award a prize.

2. The gaming device of claim 1 further comprising a game play meter in communication with the game controller, the game play meter displaying the number of games determined by the controller.

3. The gaming device of claim 1 wherein the game controller is configured to carry out the determined number of games in an automated fashion.

4. The gaming device of claim 1, wherein the game controller is configured to add each prize that is awarded in each of the determined number of games to obtain a cumulative prize.

5. The gaming device of claim 4 further comprising a prize meter, the cumulative prize being displayed on a prize meter.

6. The gaming device of claim 4, wherein the game controller is configured to generate a multiplier and multiply the multiplier by the cumulative prize to obtain a total prize.

7. The gaming device of claim 6, further comprising a multiplier meter, the multiplier being displayed on the multiplier meter.

8. The gaming device of claim 4, the controller configured to generate a consolation prize if the cumulative prize is zero.

9. The gaming device of claim 1, the display device comprising a plurality of mechanical reels or wheels rotatable about an axis.

10. The gaming device of claim 9 wherein the second game outcome is conveyed by combinations of indicia appearing on the mechanical reels or wheels.

11. The gaming device of claim 1, wherein the display device comprises a video display.

12. The gaming device of claim 11, the video display configured to display a plurality of rotating reels or wheels.

13. A method of playing a game using a gaming device comprising, but not necessarily in the order shown:

(A) allowing a player to place a wager;

(B) conducting a first game on the gaming device, the first game having a first game outcome;

(C) determining if the first game outcome is a qualifying event;

(D) if the first game outcome is a qualifying event, randomly generating a number of times to automatically play a second game, wherein the second game may be the same or different than the first game; and (E) conducting a plurality of second game rounds in automatic fashion without input from a game player, each game round comprising:

(a) determining a second game outcome;

(b) displaying a game;

(c) if the second game outcome comprises a winning outcome, awarding a prize.

14. The method of claim 13, each second game round further comprising:

(a) adding each prize to obtain a cumulative prize; and (b) awarding the cumulative prize.

15. The method of claim 14, further comprising displaying the cumulative prize to the player.

16. The method of claim 14, further comprising awarding a consolation prize if the cumulative prize is zero.

17. The method of claim 13, further comprising:

(a) adding any prize awarded in each second game round to obtain a cumulative prize;

(b) generating a multiplier;

(c) multiplying the multiplier by the cumulative prize to obtain a total prize;

(d) awarding the total prize to the player.

18. The method of claim 17, further comprising displaying the multiplier.

19. The method of claim 17, further comprising displaying the total prize.

20. The method of claim 17, further comprising awarding a consolation prize if the cumulative prize is zero.

21. The method of claim 17, further comprising:

a. generating consolation prize if the cumulative prize is zero; and b. awarding the consolation prize to the player.

22. The method of claim 13, wherein the step of displaying a game in step (E)(b) comprises rotating a plurality of reels bearing a plurality of indicia.

23. A method of playing a game comprising, but not necessarily in the order shown:

(A) allowing a player to place a wager on a game of chance having at least a partially random outcome;

(B) generating a number of game rounds to allow the player to play a game of chance;

(C) displaying a game to the player;

(D) determining a game outcome;

(E) if the game outcome is a winning outcome, awarding a prize to the player; and (F) repeating steps C–E for the number of game rounds.

24. The method of claim 23, wherein steps C–F occur in a bonus game.

25. The method of claim 23, wherein the number of game rounds is at least partially randomly determined.

26. The method of claim 23, further comprising allowing the player to initiate each game round.

27. The method of claim 23, further comprising automatically initiating each game round.

28. The method of claim 23, further comprising displaying the generated number of times to the player.

29. The method of claim 28, further comprising decrementing the number displayed to the player after each game round is completed.

30. The method of claim 23, further comprising:

(A) after awarding the prize to the player, adding the prize to a cumulative prize; and (B) awarding the cumulative prize to the player.

31. The method of claim 30, further comprising displaying the cumulative prize to the player.

32. The method of claim 30, further comprising awarding a consolation prize to the player if the cumulative prize is zero.

33. The method of claim 30, further comprising:

(A) generating a consolation prize if the cumulative prize is zero; and (B) awarding the consolation prize to the player.

34. The method of claim 33, wherein the consolation prize is at least partially randomly determined.

35. The method of claim 23, further comprising:

(A) after awarding the prize to the player, adding the prize to a cumulative prize;

(B) generating a multiplier;

(C) multiplying the multiplier by the cumulative prize to obtain a total prize; and (B) awarding the total prize to the player.

36. The method of claim 35, wherein the multiplier is at least partially randomly determined.

37. The method of claim 35, further comprising awarding a consolation prize if the cumulative prize is zero.

38. The method of claim 37, wherein the consolation prize is at least partially randomly determined.

39. The method of claim 35, further comprising displaying the cumulative prize to the player.

40. The method of claim 35, further comprising displaying the multiplier to the player.

41. The method of claim 35, further comprising displaying the total prize to the player.

42. A gaming device for playing a game by a player, the gaming device comprising:

(A) a housing;

(B) a display device coupled to the housing, the display device adapted to present a player with a game of chance having at least a partially randomly determined game outcome;

(C) a plurality of mechanical reels coupled to the display device, the mechanical reels comprising a plurality of indicia and rotatable about an axis;

(D) a game controller in communication with the display device, the controller configured to:

(a) determine the game outcome;

(b) determine if the game outcome comprises a bonus qualifying outcome;

(c) if the game outcome comprises a bonus qualifying outcome, the controller configured to and cause a number of bonus rounds to be determined and played.

43. The gaming device of claim 42, wherein the controller is further configured to:

(i) determine the number of bonus rounds to be played;

(ii) determine a game outcome for each bonus round; and (iii) if the bonus round game outcome is a winning outcome, awarding a prize to the player.

44. The gaming device of claim 42, wherein the controller is further configured to add any prize awarded for each bonus round to a cumulative prize.

45. The gaming device of claim 44, wherein the controller is further configured to award a consolation prize to the player if the cumulative prize is zero.

46. The gaming device of claim 45 further comprising a prize meter, the cumulative prize being displayed on a prize meter.

47. The gaming device of claim 44, wherein the controller is further configured to:

(i) determine a multiplier;

(ii) multiply the cumulative prize by the multiplier to obtain a total prize; and (iii) award the total prize to the player.

48. The gaming device of claim 47, further comprising a multiplier meter, the multiplier being displayed on the multiplier meter.

49. The gaming device of claim 42, wherein the bonus rounds are played on the display device.

50. The gaming device of claim 42 further comprising a bonus display in communication with the game controller, wherein the bonus rounds are carried out-on the bonus display.

51. The gaming device of claim 50, the bonus display comprising at least one rotatable reel.

52. The gaming device of claim 50, the bonus display comprising at least one wheel.

53. The gaming device of claim 50, the bonus display comprising a bonus controller configured to:

i. determine a number of bonus rounds to play;

ii determine a bonus game outcome for each round; and iii. if the bonus game outcome is a winning outcome, awarding a prize to the player.

54. The gaming device of claim 42 wherein the game controller is configured to carry out the plurality of bonus rounds in an automated fashion.

55. The gaming device of claim 42, the display device comprising a plurality of mechanical reels or wheels rotatable about an axis.

56. The gaming device of claim 55 wherein the game outcome is conveyed by combinations of indicia appearing on the mechanical reels or wheels.

57. The gaming device of claim 42, wherein the display device comprises a video display.

58. The gaming device of claim 57, the video display configured to display a plurality of rotating reels or wheels.

* * * * *